United States Patent [19]

Matsuno et al.

[11] Patent Number: 4,934,235

[45] Date of Patent: Jun. 19, 1990

[54] SHEARING MACHINE

[75] Inventors: Eiji Matsuno, Atsugi; Chuo Tobita, Isehara, both of Japan

[73] Assignee: Amada Company, Ltd., Kanagawa, Japan

[21] Appl. No.: 432,112

[22] Filed: Nov. 6, 1989

Related U.S. Application Data

[60] Division of Ser. No. 227,411, Jul. 29, 1988, which is a continuation of Ser. No. 941,579, Dec. 15, 1986, abandoned, which is a continuation of Ser. No. 729,330, May 1, 1985, abandoned.

[30] Foreign Application Priority Data

| May 2, 1984 | [JP] | Japan | 59-064398 |
| May 11, 1984 | [JP] | Japan | 59-067727 |
| May 11, 1984 | [JP] | Japan | 59-067729 |
| Apr. 22, 1985 | [JP] | Japan | 60-58882 |
| Apr. 22, 1985 | [JP] | Japan | 60-58884 |

[51] Int. Cl.$^5$ .................................. B26D 7/02
[52] U.S. Cl. ..................................... 83/452; 83/620; 83/694; 264/228
[58] Field of Search ............... 83/452, 457, 460, 461, 83/620, 694; 269/228

[56] References Cited

U.S. PATENT DOCUMENTS

| 629,532 | 7/1899 | Thomas . |
| 838,554 | 12/1906 | Lasance . |
| 1,796,763 | 3/1931 | Patterson . |
| 2,289,140 | 7/1942 | Mohan . |
| 2,634,639 | 4/1953 | Sowell . |
| 3,054,316 | 9/1962 | Pearson . |
| 3,196,742 | 11/1965 | Biernot . |
| 3,215,017 | 11/1965 | Rutz . |
| 3,691,887 | 9/1972 | Roch . |
| 3,815,403 | 6/1974 | Daniels . |
| 3,830,022 | 8/1974 | Shaw et al. . |
| 3,850,067 | 11/1974 | Davey . |
| 3,935,778 | 2/1976 | Pretty . |
| 4,040,318 | 8/1977 | Makeev et al. . |
| 4,129,054 | 12/1978 | Fazis . |
| 4,283,973 | 8/1981 | Spencer . |
| 4,347,754 | 9/1982 | Wehler . |
| 4,399,730 | 9/1983 | Oswalt, Jr. . |
| 4,403,897 | 9/1983 | Willis . |
| 4,483,227 | 11/1984 | Camisa . |
| 4,507,995 | 4/1985 | Bredow . |
| 4,535,665 | 8/1985 | Fazis . |

Primary Examiner—Hien H. Phan
Assistant Examiner—Scott A. Smith
Attorney, Agent, or Firm—Armstrong, Nikaido, Marmelstein, Kubovcik & Murray

[57] ABSTRACT

The present invention relates to shearing machine in which the upper shearing blade can be easily adjusted and positioned. The upper blade is held on a pivotal plate member which is pivotally held on a ram by means of a hinge to be rotated to adjust of the position of the upper blades. In addition, a hold down member is provided for holding a work-sheet. The hold down member is arranged to be urged by a toggle joint to hold the work-sheet at a reduced speed with an increased force after coming into contact with the work-sheet. A scrap removal member is also included in the shearing machine such that scraps can be easily removed without mingling them with the finished sheets. The scrap removal member removes scrap without idle time between feeding the work-sheets to be sheared. The shearing machine is so arranged that scraps are taken away directly to a scrap box as soon as the work-sheet has been complete sheared into its finished product.

1 Claim, 9 Drawing Sheets

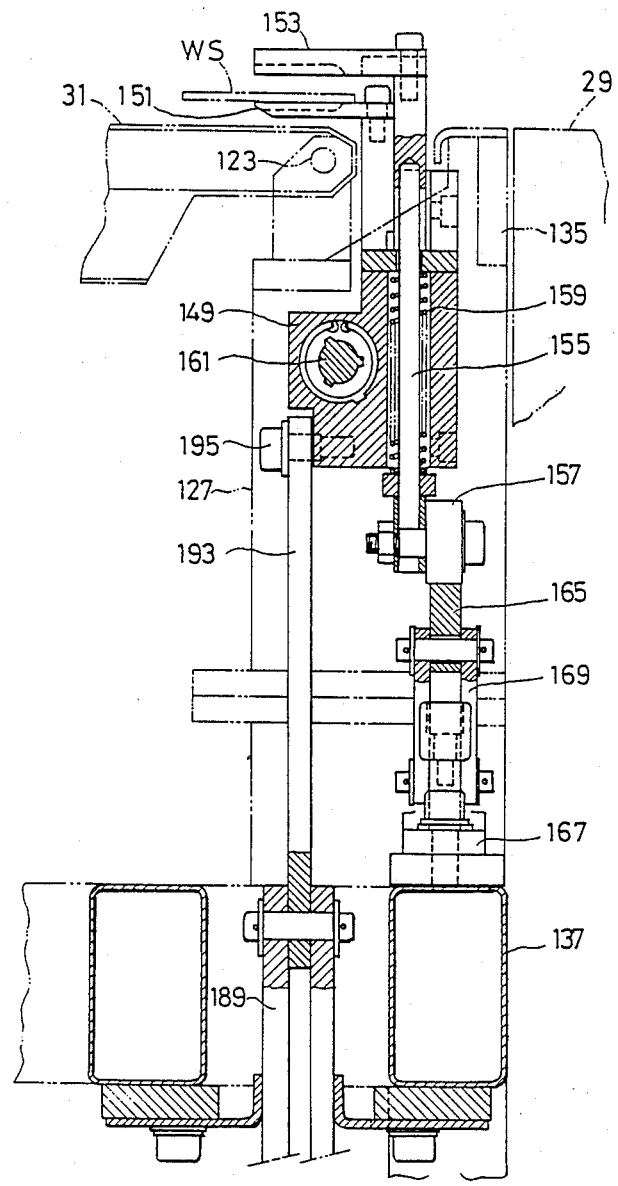

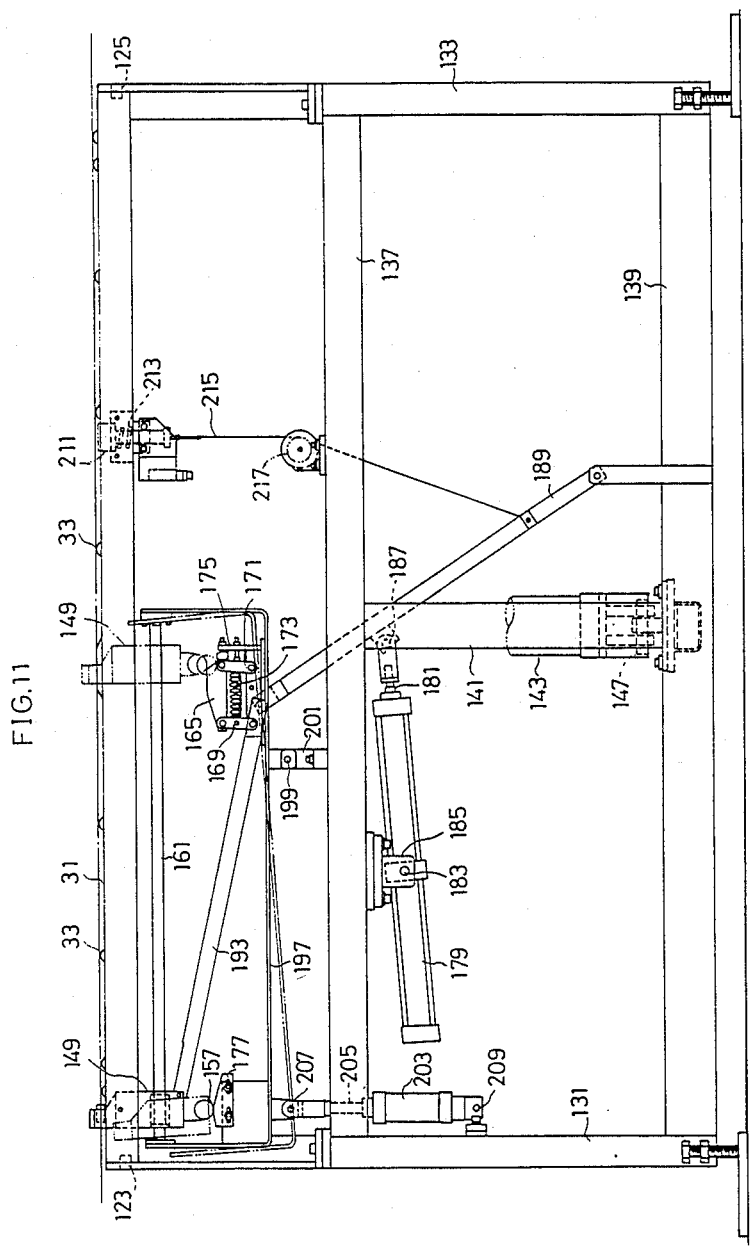

SHEARING MACHINE

This is a division of Ser. No. 227,411, filed 7/29/88, which is a continuation of Ser. No. 941,579, filed 2/15/86, now abandoned, which is a continuation of Ser. No. 729,330, filed 5/1/85, now abandoned.

BACKGROUND OF THE INVENTION

1. Field of the Invention

The present invention relates to a shearing machine which is provided with upper and lower shearing blades and can be used to cut or shear a sheet-like workpiece such as a sheet metal into many finished sheets which are referred to as blanks.

2. Description of the Prior Art

As is well-known, a shearing machine is provided with a pair of upper and lower shearing blades and is used to cut or shear a work-sheet or sheet-like workpiece such as a sheet metal into many finished sheets which are referred to as blanks. Each of the upper and lower shearing blades is designed to be straightly elongated in many cases but is also designed to be L-shaped to shear the work-sheet into L-shaped configurations. The shearing machine is also provided with a hold-down means for holding the work-sheet to be sheared and a work-table on which the work-sheet to be sheared is moved to be fed into and positioned between the upper and lower shearing blades. Furthermore, the shearing machine is often provided with a workpiece clamping and positioning means for clamping and positioning the work-sheet on the work-table between the upper and lower shearing blades. The work-sheet clamping and positioning means comprises a first carriage means movable toward and away from the upper and lower shearing blades and a second carriage means which has a clamping means for clamping the work-sheet and is movable on the first carriage means at right angles with the travelling course thereof. After a work-sheet has been sheared into as many blanks as possible in such a shearing machine, the end portion of the work-sheet which is clamped by the clamping means cannot be utilized as blanks and is disposed of as a scrap.

In the shearing machine of the above described arrangement, it is necessary to keep the upper shearing blade in parallel with the travelling course of the second carriage of the work-sheet clamping and positioning means so as to perform accurate shearing operations. Heretofore, however, it has been very difficult and time-consuming to adjust the parallelism of the upper shearing blade, since it has been necessary to adjust the mounting of the work-sheet clamping and positioning means or the upper shearing blade in its entirely.

It has been another disadvantage with conventional shearing machines that tremendous noises will occur each time when the work-sheet to be sheared is held down by the hold-down means.

Also, it has been customary that scraps produced from work-sheets during shearing operations are handled in the same manner as blanks and are mingled into blanks. Accordingly, it has been necessary in conventional shearing machines to pick up or select out scraps from blanks after work-sheets have been sheared in shearing operations.

There have been some shearing machines which are provided with a scrap removing means for removing a scrap each time when a work-sheet has been sheared into blanks. However, in conventional shearing machines, such a scrap removing means is so arranged as to remove scraps at a position where work-sheets are to be fed to be sheared. Accordingly, it has been conventionally disadvantageous even in that work-sheets cannot be fed to be sheared when scraps are being removed with a result that plenty of idle time is necessary, even if a scrap removing means is provided.

SUMMARY OF THE INVENTION

It is an object of the present invention to provide a shearing machine in which the upper shearing blade can be easily adjusted in position to perform accurate shearing operations.

For this object, the upper blade is held on a pivotal plate member which is pivotally held on the ram by means of a hinge means to be rotated for the adjustment of the position of the upper blades.

It is an object of the present invention to provide a shearing machine in which noises are reduced when the worksheet to be sheared is held down by the hold-down means for holding the work-sheet. The hold-down means is so arranged as to be urged by a toggle joint means to hold the work-sheet at a reduced speed with an increased force after going into contact therewith.

It is an object of the present invention to provide a shearing machine which is provided with a scrap removing means by which scraps produced from work-sheets can be easily removed without mingling into finished sheets or blanks, even if they are large and long.

It is another object of the present invention to provide a shearing machine which is provided with a scrap removing means which can remove a scrap without idle time when another work-sheet is being fed to be sheared.

In order to attain these objects of the present invention, a shearing machine is so arranged that scraps are taken and brought away directly into a scrap box as soon as a work-sheet has been completely sheared into finished sheets or blanks.

Other and further objects and advantages of the present invention will be apparent from the following description and accompanying drawings which, by way of illustration, show preferred embodiments of the present invention and the principles thereof.

BRIEF DESCRIPTION OF THE DRAWINGS

FIG. 10 is an enlarged sectional view taken along the line X—X of FIG. 9.

FIG. 11 is a view of another embodiment of a portion of the shearing machine corresponding to that shown in FIG. 9.

DESCRIPTION OF THE PREFERRED EMBODIMENTS

Figure 1:
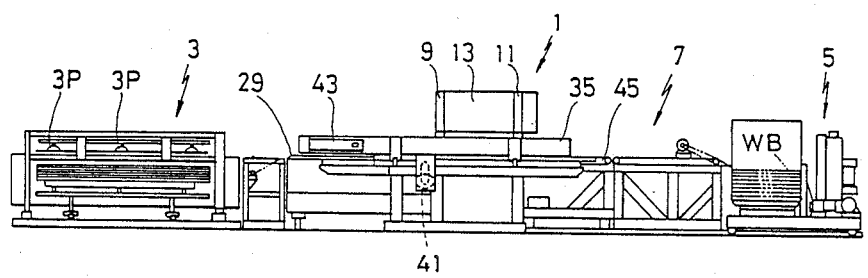
FIG. 1 is a front elevational view showing a shearing machine embodying the principles of the present invention.
Figure 2:
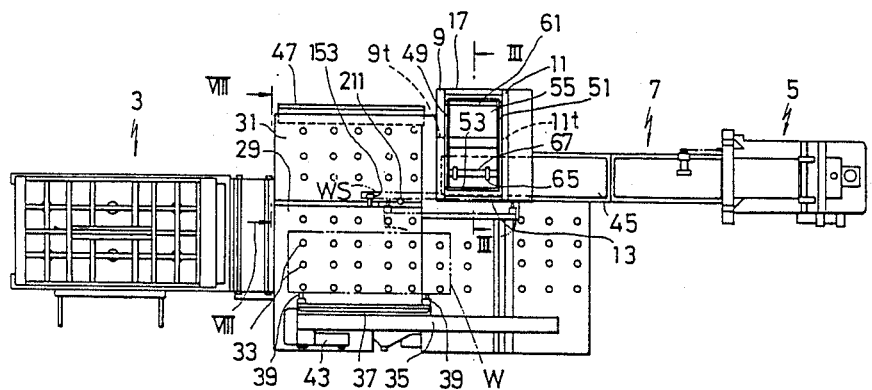
FIG. 2 is a top plan view of the shearing machine shown in FIG. 1.

Referring now to FIGS. 1 and 2, a shearing machine 1 for shearing work-sheets W such as sheet metals is shown as connected to a sheet loading apparatus 3 having a pick-up means 3p on one hand and also connected to a sheet stacking apparatus 5 through a conveyor 7 on the other hand. The arrangement is such that the shearing machine 1 is fed with the work-sheets W from the sheet loading apparatus 3 and shears them into finished sheets namely blanks WB, which are to be conveyed to the sheet stacking apparatus 5 by the conveyor 7.

Figure 3:
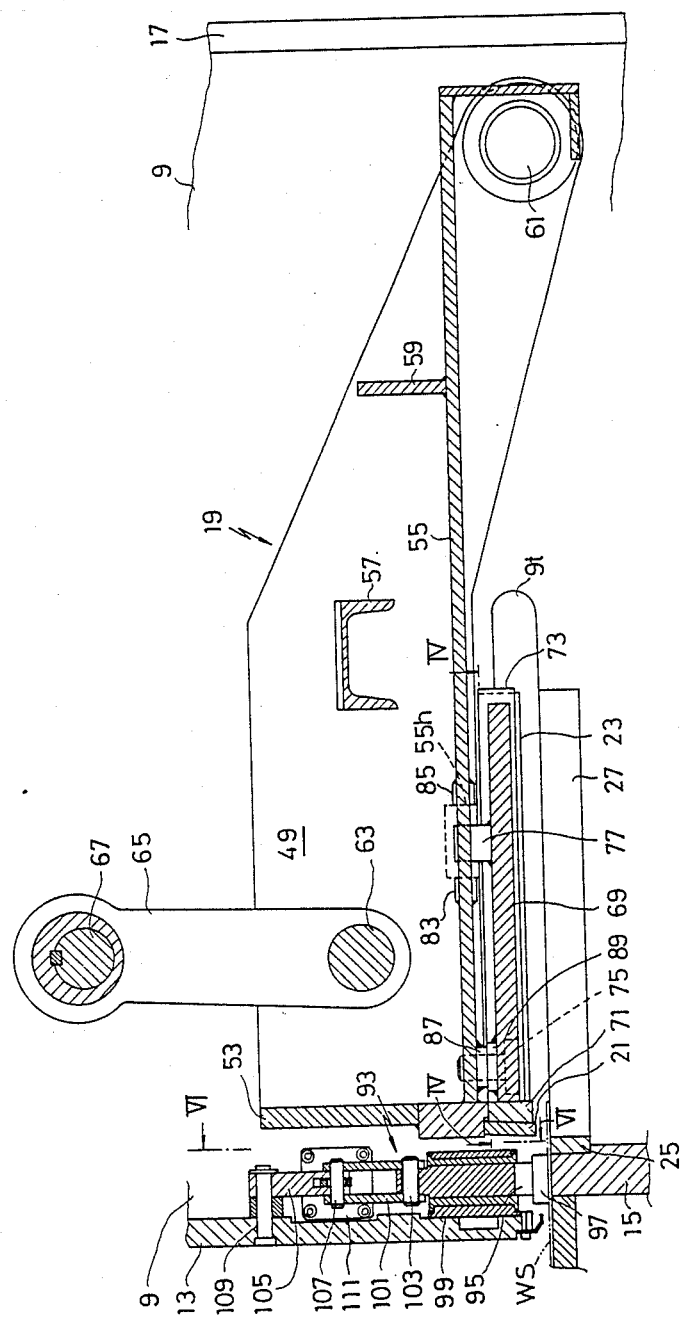
FIG. 3 is an enlarged sectional view taken along the line III—III of FIG. 2.

As best shown in FIGS. 1, 2 and 3, the shearing machine 1 comprises a pair of C-shaped upright plates 9 and 11 which are formed at their midway portions with throats 9t and 11t, respectively, and are connected with each other by an upper front plate 13, a lower front plate 15 and a rear plate 17 to form a box-like frame. Particularly, the upright plates 9 and 11 are disposed in parallel with each other, and the upper and lower front plates 13 and 15 are fixed to the upper and lower portions, respectively, of the forward ends of the upright plates 9 and 11 at right angles therewith. Also, the throats 9t and 11t of the upright plates 9 and 11 are horizontally formed on a level with each other in such a manner as to extend in parallel with each other and open forwardly about the top of the lower front plate 15 so that a work-sheet W can be horizontally inserted and moved therein to be sheared.

Figure 4:
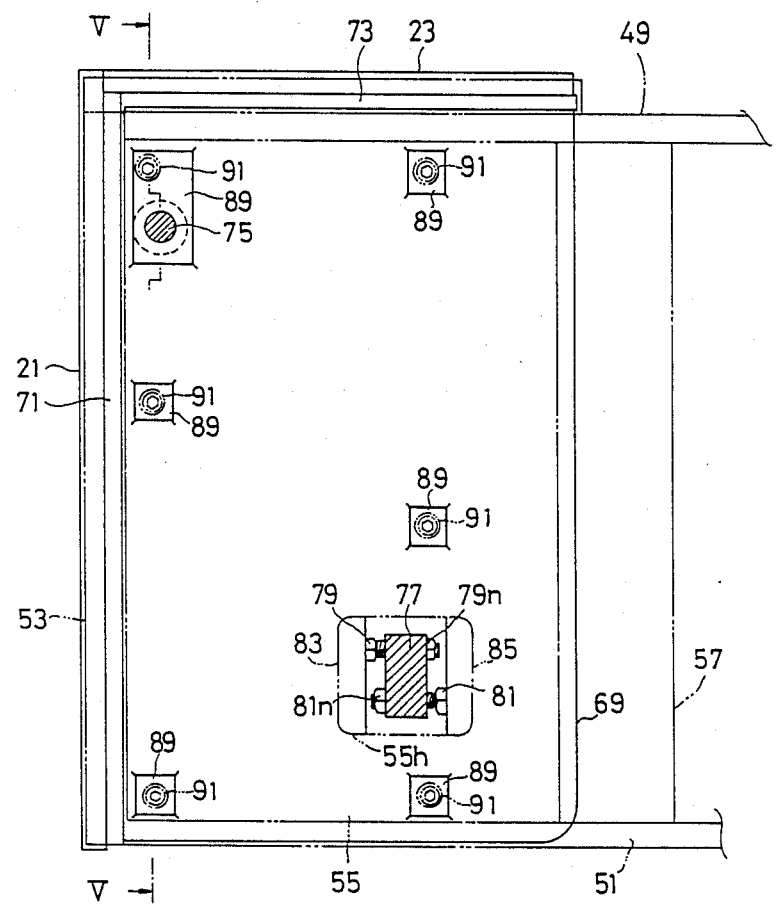
FIG. 4 is a sectional view taken along the line IV—IV of FIG. 3.

Referring to FIGS. 3 and 4 in addition to FIGS. 1 and 2, the shearing machine 1 is provided with a ram 19 carrying an elongated upper front blade 21 and an elongated upper side blade 23, and it is also provided with an elongated lower front blade 25 and an elongated lower side blade 27. As will be described in detail hereinafter, the ram 19 is so disposed as to be moved up and down between the upright plates 9 and 11 behind the front upper plate 13 in a conventional manner to move the upper front and side blades 21 and 23 up and down. The upper front blade 21 is detachably fixed to the forward bottom end of the ram 19 in parallel with the upper front plate 13 and the upper side blade 23 is detachably fixed to the side of the ram 19 in parallel with the upright plate 9, as will be described in great detail. More specifically, the upper front and side blades 21 and 23 are fixed to the ram 19 in such a manner to be integrally connected with each other at a right angle to work as a single L-shaped blade. On the other hand, the lower front blade 25 is detachably and horizontally fixed to the top of the lower front plate 15 and the lower side blade 27 is detachably and horizontally fixed to the throat 9t of the upright plate 9 on a level with the lower front blade 25. In the same manner as the upper front and side blades 21 and 23, the lower front and side blades 25 and 27 are integrally connected with each other so as to work as a single L-shaped blade. Thus, when the ram 19 is lowered, the upper front and side blades 21 and 23 will be brought by the ram 19 integrally simultaneously into engagement with the lower front and side blades 25 and 27 to cooperate therewith to shear a work-sheet W which is to be placed on the lower front and side blades 25 and 27.

In this connection, it is to be noted that the present invention is not limited in application to the shearing machine having the upper and lower side blades 23 and 27 in addition to the upper and lower front blades 21 and 25. It should be understood that the present invention is applicable also to a shearing which is provided with a single upper blade and a single lower blade.

Figure 8:
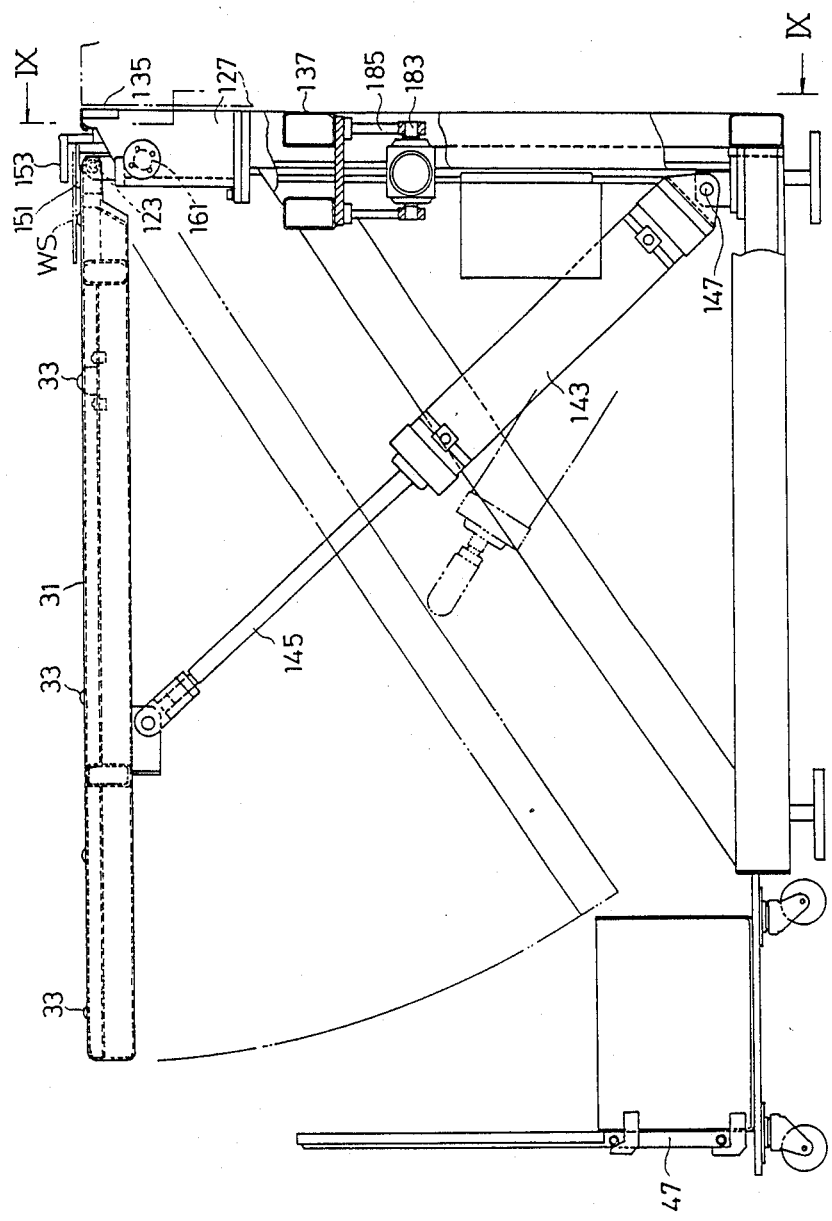
FIG. 8 is an enlarged sectional view taken along the line VIII—VIII of FIG. 2.
Figure 9:
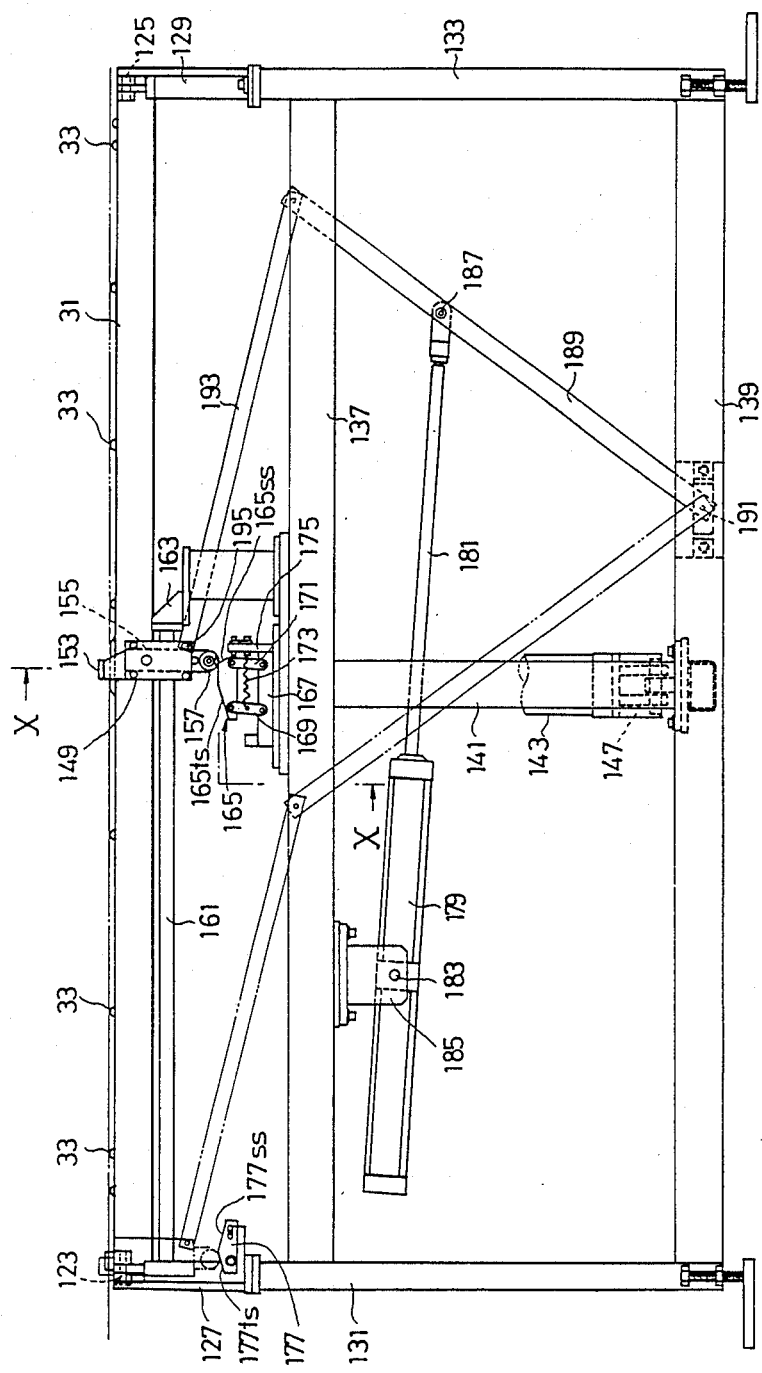
FIG. 9 is a sectional view takne along the line IX—IX of FIG. 8.

As shown in FIGS. 1 and 2 and also in FIGS. 8, 9 and 11, the shearing machine 1 is provided with a fixed work-table 29 and a swingable work-table 31 on which the work-sheet W to be sheared is placed to be fed into between the upper front and side blades 21 and 23 and the lower front and side blades 25 and 27 into the throats 9t and 11t of the upright plates 9 and 11. The work-table 29 can be designed to cover the area of the swingable work-table 31, but the swingable work-table 31 is provided in such a manner as to be downwardly swingable for one of the purposes of the present invention, as will be described in great detail hereinafter. The fixed and swingable work-tables 29 and 31 are provided at their top surfaces with a plurality of ball sliders 33 so that the work-sheet W can be slid thereon. Also, the fixed and swingable work-tables 29 and 31 are so disposed that the tops of the ball sliders 33 are on a level with the tops of the lower front and side blades 25 and 27. Thus, the work-sheet W can be slid on the fixed and swingable work-table 29 and 31 to be fed and positioned between the upper front and side blades 21 and 23 and the lower front and slide blades 25 and 27 in the throats 9t and 11t of the upright plates 9 and 11.

In order to feed and position the work-sheet W to be sheared, the fixed work-table 29 is provided with a first carriage 35 horizontally movable and a second carriage 37 slidably mounted on the first carriage 35 and having a plurality of clamping means 39 to carry the work-sheet W. The first carriage 35 is so arranged as to be horizontally moved on the fixed work-table 29 toward and away from the lower front and side blades 25 and 27 by a motor 41 to carry the second carriage 37. Also, the second carriage 37 is so arranged as to be horizontally moved on the first carriage 35 rightward and leftward by a motor 43 to carry the clamping means 39 holding the work-sheet W to be sheared. Thus, the work-sheet W is loaded from the sheet loading apparatus 3 by the pick-up means 3p and is gripped by the clamping means 39, and it is fed onto the lower front and side blades 25 and 27 by the first and second carriages 35 and 37. Also, it will be understood that the work-sheet W placed on the work-table 31 and held by the clamping means 39 can be fed and positioned anywhere onto the lower front and side blades 25 and 27 by moving the first and second carriages 35 and 37.

In the above described arrangement, the work-sheet W can be sheared when it has been positioned onto the lower front and side blades 25 and 27 by the first and second carriages 35 and 37 and the ram 19 is lowered to enable the upper front and side blades 21 and 23 to cooperate with the lower front and side blades 25 and 27. The work-sheet W will be sheared, of course, into a L-shaped configuration in each shearing cycle to produce a square finished sheet or blank, when it is positioned on both of the lower front and side blades 25 and 27. However, the work-sheet W can be straightly sheared when positioned either of the lower front and side blades 25 and 27, and mostly the work-sheet W is sheared straightly by the upper and lower front blades 21 and 25 which are longer than the upper and lower side blades 23 and 27, respectively. As will be readily understood, the finished sheet or blanks WB which are sheared from the work-sheet W will be dropped into behind the lower front and side blades 25 and 27, and they are brought away in a manner as will be described immediately hereinafter. Also, the end portion of the work-sheet W which is gripped by the clamping means 39 is removed as a scrap according to the present invention as will be described in great detail hereinafter.

As is also shown in FIGS. 1 and 2, the shearing machine 1 is provided with a conveying means 45 to bring out the finished sheets or blanks WB which are sheared from the work-sheet W by the upper front and side blades 21 and 23 and the lower front and side blades 25 and 27. The conveying means 45, which is shown as a belt conveyor, is disposed behind the lower front and side blades 25 and 27 to project out of the shearing machine 1, and it is connected to the conveyor 7 which is further connected to the stacking apparatus 5. Thus, the blanks WB sheared from the work-sheet W are received and brought out by the conveying means 45 to the conveyor 7, and then they are conveyed to the stacking apparatus 5 by means of the conveyor 7.

As shown in FIGS. 2 and 8, there is provided a scrap box 47 behind the swingable work-table 31 and outside the upright plate 9 to receive scraps which will be produced from work-sheets W during shearing operations. As has been described a little hereinbefore, the end portion of the work-sheet W which is gripped by the clamping means 39 of the second carriage 37 cannot be utilized as a blank and is disposed of as a scrap WS after the work-sheet W has been sheared into as many blanks as possible. The scrap box 47, which is shown in FIG. 8 as a movable cart, is provided outside the upright plate 9 in close proximity to the swingable work-table 31 so that the scraps can be dropped thereinto from the top surface of the work-table 31.

Referring again to FIGS. 3, 4 and 5, the ram 19 carrying the upper front and side blades 21 and 23 comprises a pair of upstanding plates 49 and 51, a front plate 53 connecting the forward ends of the upstanding plates 49 and 51 and a bottom plate 55 connecting the substantial lower ends of the upstanding plates 49 and 51. More particularly, the upstanding plates 49 and 51 are in parallel with each other and are disposed between the upright plates 9 and 11 in parallel therewith. Also, the front plate 53 is fixed to the front ends of the upstanding plates 49 and 51 in parallel therewith in an upstanding manner, and the bottom plate 55 is laterally fixed to the lower ends of the upstanding plates 49 and 51 and the front plate 53. Furthermore, the ram 19 is reinforced by a channel-like member 57 and a rib member 59 which are both horizontally fixed between the upstanding plates 49 and 51. In the preferred embodiment, the ram 19 is pivotally held on a pivot means 61 such as a shaft held between the upright plate 9 and 11 in such a manner as to be swung up and down, although it can be so arranged as to be vertically moved along vertical guide means. Also, in order to enable the ram 19 to swing up and down about the pivot means 61, a shaft 63 is horizontally fixed between the upstanding plates 49 and 51 and is connected by a pair of connecting rods 65 to an eccentric shaft 67 which is driven in a conventional manner. Thus, when the eccentric shaft 67 is driven, the ram 19 will be swung about the pivot means 61 to move the upper front and side blades 21 and 23 up and down toward and away from the lower front and side blades 25 and 27.

Figure 5:
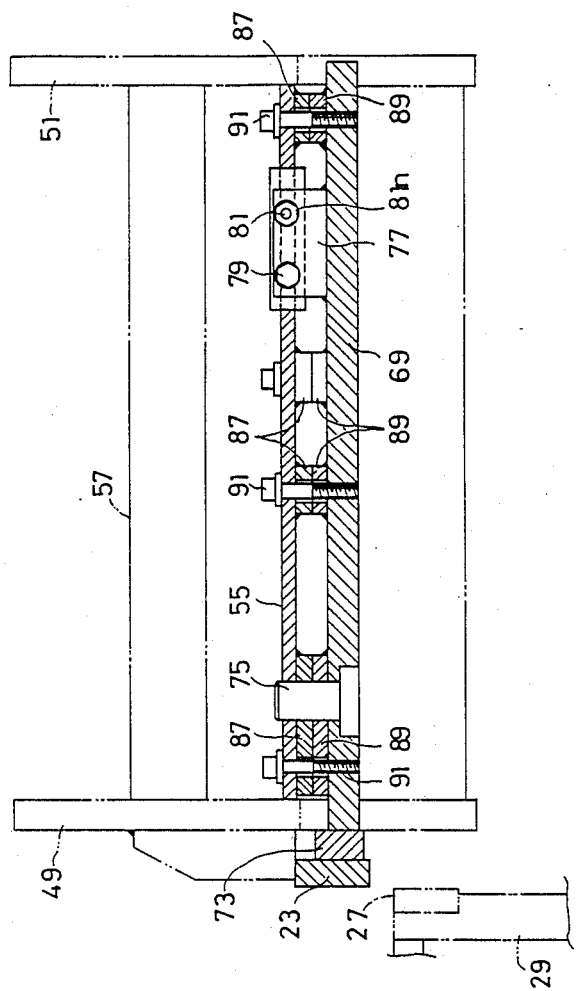
FIG. 5 is a sectional view taken along the line V—V of FIG. 4.

Referring further to FIGS. 3, 4 and 5, the upper front and side blades 21 and 23 are adjustably held on the ram 19 so that they can be adjusted to keep in parallel with the X and Y axes, respectively, of the shearing machine 1 namely the travelling lines of the second and first carriages 37 and 35, respectively. For this purpose, the upper front and side blades 21 and 23 are held by a pivotal plate member 69 on the ram 19 by means of elongated blade holding means 71 and 73, respectively. The pivotal plate member 69 is rectangular in shape, and it is pivotally disposed on the underside of the bottom plate 55 in such a manner as to be rotated a little about a pivot pin 75 which is provided near the left-hand front corner of the bottom plate 55 of the ram 19. The blade holding means 71 and 73, on which the upper front and side blades 21 and 23, respectively, are detachably fixed, are fixed to the front and left-hand ends, respectively, of the pivotal plate member 69 at right angles to each other.

In order to adjust the position of the upper front and side blades 21 and 23, a screw holding member 77 is fixed on the top surface of the pivotal plate member 69 near the right-hand rear corner thereof and a pair of adjusting screws 79 and 81 having nuts 79n and 81n are provided on the screw holding member 77. The screw holding member 77 is disposed to upwardly project through a hole 55h which is formed through the bottom plate 55 of the ram 19, and a pair of stop members 83 and 85 are provided in the hole 55h to receive and stop the adjusting screws 79 and 81, respectively. The arrangement is such that the adjusting screws 79 and 81 are threaded in the screw holding member 77 into engagement with the stop members 83 and 85 in directions opposite to each other to adjust the position of the upper front and side blade 21 and 23 and fix the pivotal plate member 69.

In the preferred embodiment, a plurality of slide members 87 and 89 are fixed in pairs to the underside of the bottom plate 55 of the ram 19 and the top surface of the pivotal plate member 69, respectively, in a manner such that each pair of slide members 87 and 89 are in substantial vertical alignment with each other. In order to adjustably fix the pivotal plate member 69 to the bottom plate 55 of the ram 19, a plurality of bolts 91 are provided through the bottom plate 55, the pivotal plate member 69 and the slide member 87 through holes which are formed therethrough and are larger in diameter than the bolts 91.

In the above described arrangement, the position of the upper front and side blades 21 and 23 can be adjusted by rotating the pivotal plate member 69 about the pivot pin 75 so that they may be in parallel with the X and Y axes, respectively, of the shearing machine 1. More particularly, the position of the upper and front and side blades 21 and 23 can be adjusted when the adjusting bolts 79 and 81 are rotated after the bolts 91 have been loosened. It will be understood that the pivotal plate member 69 can be rotated in spite of the bolts 91 to adjust the position of the upper front and side blades 21 and 23 since the bolts 91 are disposed in the holes which are formed larger in diameter than the bolts 91 through the bottom plate 55 of the ram 19 and the pivotal plate member 69 and the slide members 87 and 89.

Figure 6:
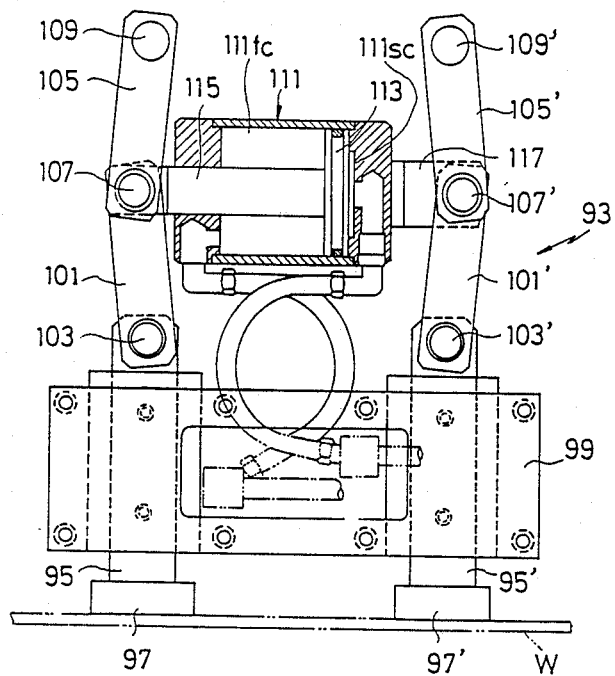
FIG. 6 is an enlarged sectional view taken along the line VI—VI of FIG. 3.

Referring to FIGS. 3 and 6, a plurality of hold-down means 93 are provided at the backsides of the front plate 13 and the upright plate 9 to hold down the work-sheet W to be sheared onto the fixed work-table 29 or the lower front and side blades 25 and 27. Each of the hold-down means 93 comprises a pair of elongated hold-down members 95 and 95' which are provided at their lower ends with hold-down pads 97 and 97' to hold down the work-sheet W to be sheared. The hold-down members 95 and 95' are vertically slidably held in parallel with each other by a guide bracket 99 which is fixed to the backside of the front plate 13 and the upright plate 9. The hold-down members 95 and 95' are pivotally connected at their top ends to first links 101 and 101', respectively, by pins 103 and 103', respectively. Also, the first links 101 and 101' are pivotally connected to second links 105 and 105', respectively, by pins 107 and 107', respectively. The second links 105 and 105' are pivotally secured to the front plate 13 or the upright plate 9 by pins 109 and 109', respectively, located just above the pins 103 and 103', respectively. Thus, the arrangement is such that the hold-down members 95 and 95' will be simultaneously downwardly urged by the first links 101 and 101' to hold down the work-sheet W when the first links 101 and 101' and the second links 105 and 105' are stretched more or less straightly.

The hold-down members 95 and 95' are so arranged as to be originally driven by a hydraulic or pneumatic motor or cylinder 111 which has a piston 113 having a piston rod 115 and dividing the interior of the cylinder 111 into first and second chambers 111fc and 111sc. The cylinder 111 is provided at its end opposite to the piston rod 115 with a link 117 which is pivotally connected to the pin 107' and the piston rod 115 is pivotally connected to the pin 107. Thus, when the first chamber 111fc of the cylinder 111 is supplied with the hydraulic or pneumatic fluid, the piston rod 115 and the link 117 will pull the pins 107 and 107', respectively, to enable the links 101 and 101', respectively, to downwardly urge the hold-down members 95 and 95', respectively. Also, when the second chamber 111sc of the cylinder 111 is supplied with the hydraulic or pneumatic fluid, the piston rod 115 and the link 117 will push the pins 107 and 107', respectively, to raise the hold-down members 95 and 95', respectively.

In the above described arrangement, the piston rod 115 of the cylinder 111 and the first link 101 and the second link 105 will function as a toggle mechanism, and the link 117 of the cylinder 111 and the first link 101' and the second link 105' will also act as a toggle mechanism. Thus, the hold-down members 95 and 95', when urged downwardly by the cylinder 111 through the first links 101 and 101', will be lowered initially at a higher speed and then at a lower speed but with an increased force to hold down the work-sheet W to be sheared. Accordingly, it will be understood that the hold-down members 95 and 95' can hold down the work-sheet W to be sheared with less noises and with an increased force.

Figure 7:
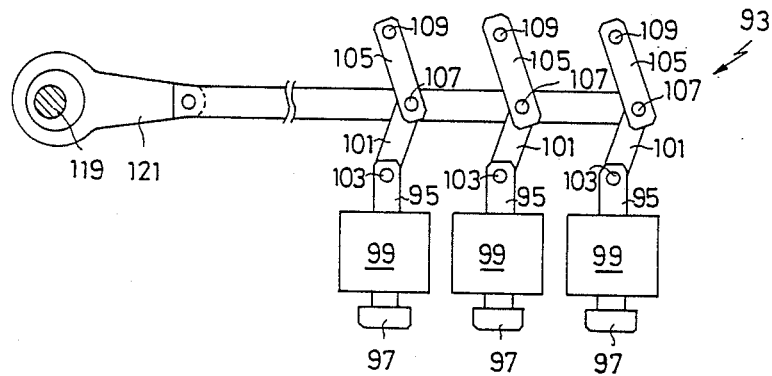
FIG. 7 is a view of another embodiment of a portion of the shearing machine corresponding to that shown in FIG. 6.

Referring to FIG. 7, there is shown another embodiment of the hold-down means 93 in which a plurality of hold-down members 95 are mechanically driven by an eccentric shaft 119 through a connecting rod 121. In the more or less same manner as the embodiment shown in FIG. 6, each of the hold-down members 95 having a hold-down pad 97 is vertically slidably disposed in a guide bracket 99 and is connected by a pin 103 to a first link 101 which is connected by a pin 107 to a second link 105 pivotally secured to a pin 109. The connecting rod 121 driven by the eccentric shaft 119 is pivotally connected to the pins 107 so that it will constitute toggle mechanisms with the first and second links 101 and 105. Thus, when the connecting rod 121 is moved to pull the pins 107 to stretch the first and second links 101 and 105, the hold-down members 95 will be downwardly urged to hold down the work-sheet W to be sheared initially at a higher speed and then at a lower speed but with an increased force.

Referring to FIG. 8 and 9, the swingable work-table 31 is pivotally held by a pair of pins 123 and 125 so that it may be swung down from the horizontal level to enable the scraps WS produced from the work-sheet W to slide down therefrom into the scrap box 47. As will be seen hereinafter, the swingable work-table 31 is so disposed that its front end is substantially in alignment with the rearmost travelling limits of the clamping means 39 of the second carriage 35. The pins 123 and 125 on which the swingable work-table 31 is pivotally held are horizontally held on brackets 127 and 129, respectively, which are fixed to posts 131 and 133, respectively, and are connected with each other by a horizontal beam member 135. The posts 131 and 133 are connected with each other by an upper horizontal beam member 137 and a lower horizontal beam member 139, and there is provided another post 141 in the middle between the posts 131 and 133 in such a manner as to connect the upper and lower beam members 137 and 139. The swingable work-table 31 is so arranged as to be swung about the pins 123 and 125 by a hydraulic or pneumatic motor or cylinder 143 which has a piston rod 145 pivotally connected to the swingable work-table 31 and is pivotally connected to a portion of the beam member 139 by a pin 147. Thus, when the swingable work-table 31 is swung down about the pins 123 and 125 by the cylinder 143, the scraps WS which have been brought onto the swingable work-table 31 will be slid down into the scrap box 47.

Referring to FIGS. 8, 9 and 10, a carrier means 149 is provided between the swingable work-table 31 and the fixed table 29 to receive the scraps WS from the clamping means 39 of the second carriage 37 and carry them onto the swingable work-table 31. The carrier means 149 is provided with a lower fixed jaw 151 and an upper movable jaw 153 to grip there between the scraps WS and carry them onto the swingable work-table 31. The movable jaw 153 is integrally fixed to a slidable member 155 which is provided at its lower end with a cam follower 157, and it is kept downwardly biased onto the fixed jaw 151 by a spring 159 to grip the scraps WS in cooperation therewith. The carrier means 149 is horizontally slidably mounted on a guide rail 161 which is horizontally spanned in parallel with the front end of the swingable work-table 31 in such a manner to be always located in alignment with the rearmost travelling limits of the clamping means 39 of the second carriage 37. The guide rail 161 is horizontally spanned in parallel with the front end of the swingable work-table 31 between the bracket 127 and another bracket 163 fixed onto the beam member 137 so that the carrier means 149 may be located in alignment with the rearmost travelling limits of the clamping means 39. Also, the carrier means 149 is so arranged that the movable jaw 153 will open rearward in the same direction as the clamping means 39 so as to grip the forward end of the scrap WS which is held by the clamping means 39 at their rearmost travelling limits. Although the carrier means 149 is shown in FIG. 9 as located at the right-hand end of the guide rail 161, it is positioned at the left-hand end thereof while the work-sheet W is being sheared. Thus, the carrier means 149 is moved on the guide rail 161 rightward from the left-hand end thereof to grip the scrap WS which is held by the clamping means 39 and then it is returned on the guide rail 161 to bring the scrap WS onto the swingable work-table 31.

As shown in FIGS. 9 and 10, a cam 165 is provided on the beam member 137 just beneath the right-hand end of the guide rail 161 so that the cam follower 157 of the carrier means 149 will be brought into contact therewith. The cam 165 is formed with a first cam surface 165fs and a second cam surface 165ss on which the cam follower 157 can roll to move the movable jaw 153 of the carrier means 149 into and out contact with the fixed jaw 151 when the carrier means 149 is moved on the guide rail 161. The cam 165 is pivotally connected to a block member 167 by a plurality of parallel links 169 and 171 in a manner such that it can be swung right and left to rise and lower. Also, the cam 165 is kept biased by a spring 173 rightward to a stop plate 175 fixed to the block member 167 so that it will be normally kept raised in contact with the stop plate 175. Thus, when the carrier means 149 is moved on the guide rail 137, the cam follower 157 will roll on the cam 165 from the first cam surface 165fs to the second cam surface 165ss to initially raise the movable jaw 153 and then lower it to grip the blank WS held by the clamping means 39 of the second carriage 37. Also, when the carrier means 149 is moved on the guide rail 161 leftward from the right-hand thereof, the cam follower 157 will push and lower the cam 165 against the spring 173 without raising the movable jaw 153 to enable the fixed and movable jaws 151 and 153 to keep gripping the scraps WS.

As shown in FIG. 9, another cam 177 is provided on the bracket 127 so that the cam follower 157 of the carrier means 149 can be brought into contact therewith. The cam 177 is also formed with a first cam surface 177fs and a second cam surface 177ss on which the cam follower 157 can roll to move the movable jaw 153 of the carrier means 149 out of and into contact with the fixed jaw 151. Thus, when the carrier means 149 is moved leftward on the guide rail 161 from the right-hand end thereof with the blank WS gripped by the fixed and movable jaws 151 and 153, the cam follower 157 will initially raise the movable jaw 153 to release the scraps WS onto the swingable work-table 31 and then it will again lower the movable jaw 153.

As is also shown in FIG. 9, in order to move the carrier means 149 on the guide rail 161, a hydraulic or pneumatic motor or cylinder 179 having a piston rod 181 is pivotally mounted on the beam member 137 by a pin 183 of a bracket 185. The piston rod 181 of the cylinder 179 is pivotally connected by a pin 187 to a link 189 which is pivotally connected to the beam member 139 by a pin 191 and also to another link 193 which is pivotally connected to the carrier means 149 by a pin 195. Thus, the carrier means 149 can be moved on the guide rail 161 by the cylinder 179 by means of the links 189 and 193.

In the above described arrangement, the clamping means 39 holding the scrap WS is initially brought leftward by the second carriage 37 as soon as the work-sheet W has been sheared into as many blanks WB as possible. Then, the carrier means 149 which has been located on the left-hand end of the guide rail 161 will be moved rightward on the guide rail 161 by the cylinder by means of the links 189 and 193. When the cam follower 157 of the carrier means 149 is rolling on the first cam surface 165fs of the cam 165, the movable jaw 153 of the carrier means 149 will be raised away from the fixed jaw 151 to grip the scrap WS held by the clamping means 39. When the cam follower 157 is rolling down on the second cam surface 165ss of the cam 165, the movable jaw 153 will be lowered to cooperate with the fixed jaw 151 to grip the scrap WS held by the clamping means 39. After the scrap WS has been gripped by the fixed and movable jaws 151 and 153 and released from the clamping means 39, the carrier means 149 will lower the cam 165 by means of its cam follower 157 against the spring 173 and will be moved on the guide rail 161 leftward. When the cam follower 157 is rolling on the second cam surface 177ss of the cam 177 at the left-hand end of the guide rail 161, the movable jaw 153 of the carrier means 149 will be again raised to release the scrap WS onto the swingable work-table 31 and it will be lowered again. After the scrap WS has been brought onto the swingable work-table 31, the cylinder 143 will swing down the swingable work-table 31 to enable the scrap WS to slide down into the scrap box 47.

Referring to FIG. 11 showing another embodiment, the guide rail 161 for the carrier means 149 and the cams 165 and 177, which are shown in FIGS. 8, 9 and 10, can be mounted on a channel-like holding member 197 to enable the carrier means 149 to sink from the top level of the fixed and swingable work-tables 29 and 31. The carrier means 149, the guide rail 161 and the cams 165 and 177 are disposed in the channel-like holding member 197 in the more or less same manner as the first embodiment shown in FIGS. 8, 9 and 10. The channel-like holding member 197 is pivotally held by a pin 199 on a bracket 201 mounted on the beam member 137 in a manner such that the guide rail 161 and the carrier means 149 can be located in the same manner as the first embodiemnt. The arrangement is such that the channel-like holding member 197 is moved around the pin 199 to keep the carrier means 149 lowered from the top level of the fixed and swingable work-tables 29 and 31 and raise it when the scrap WS is to be carried onto the swingable work-table 31. Also, in order to move the channel-like holding member 197, there is provided a hydraulic or pneumatic motor or cylinder 203 which has a piston rod 205 pivotally connected to channel-like holding member 197 by a pin 207 and is pivotally connected to a portion of the post 131 by a pin 209. Thus, it will be understood that the carrier means 149 will not be any hindrance even when a large work-sheet W is being sheared, since it is kept lowered from the top level of the fixed and swigable work-tables 29 and 31.

Referring again to FIG. 11, a guide roller 211 is provided on a portion of the beam member 135 to guide the forward end of the scraps WS which is being pulled by the carrier means 149. The guide roller 211 is so arranged as to be axially vertically movable and be normally kept lowered from the top level of the fixed and swingable work-tables 29 and 31. The guide roller 211 is kept upwardly biased by a spring 213, but it is normally kept downwardly pulled by a chain or string 215 against the spring 213 to be kept lowered from the top level of the fixed and movable work-tables 29 and 31. The chain or string 215 is wound around a pulley 217 which is freely rotatably mounted on the beam member 137, and it is connected to the link 189. The arrangement is such that the chain or string 215 will be tight to keep the guide roller 211 pulled downwardly from the top level of the fixed and movable work-tables 29 and 31, when the carrier means 149 is located on the left-hand and of the guide rail 161. Thus, when the carrier means 149 is at rest at the left-hand end of the guide rail 161, the guide roller 211 will be kept lowered from the top level of the fixed and movable work-tables 29 and 31 by the chain or string 215 to be out of the way of the worksheet W. However, when the carrier means 149 is going rightward on the guide rail 161 to grip the scraps WS, the guide roller 211 will be raised by the spring 213 to project out of the top level of the fixed and movable work-tables 29 and 31, since the chain or string 215 will become loose.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A shearing machine which has an L-shaped blade shearing a sheet-like workpiece comprising:

a frame;

guide means mounted on the frame;

a plurality of hold down members held vertically slidably parallel to each other by said guide means in such a manner that said hold down members will be initially lowered at a higher speed and then lowered at a lower speed to hold down a workpiece;

a plurality of toggle joint means for raising and lowering the plurality of hold down members, each toggle joint means including a connecting means, first link pivotally connected to said hold down members, and a second link pivotally connected to said frame, said first link and said second link being pivotally connected to each other by said connecting means, said plurality of toggle joint means being so arranged as to be aligned with each other in position and in orientation; and actuating means for simultaneously actuating the plurality of toggle joint means, said actuating means, including a horizontal link pivotally connected to the connecting means, a connecting rod pivotally connected at one end thereof to the horizontal link, and an eccentric shaft engaged to another end of the connecting rod for moving the connecting rod.

* * * * *